United States Patent Office 2,762,452
Patented Sept. 11, 1956

---

2,762,452

REMOVAL OF ORGANIC SULFUR COMPOUNDS FROM GASES

Wilfred C. Gains, New York, N. Y., assignor to Chemical Construction Corporation, New York, N. Y., a corporation of Delaware No Drawing. Application January 29, 1952,
Serial No. 268,910

3 Claims. (Cl. 183—114.2)

This invention relates to the purification of hydrocarbon gases and more particularly to a process for the removal of organic sulfur compounds such as mercaptans, alkyl sulfides, as for instance, dimethyl and diethyl sulfide, the corresponding alkyl-disulfides, thiophenes and the like from natural gas, refinery gas, coke oven gas, water gas, semi-water gas and other industrial hydrocarbon or hydrocarbon containing gases.

The above gases, as a general rule, are contaminated with sulfur impurities which must be removed before they can be used satisfactorily for certain purposes. This is particularly true when the gases are to be used as raw or source material for the production or synthesis of other chemical compounds. For instance, in the catalytic production of hydrogen from natural gas and in the synthesis of ammonia, the presence of sulfur impurities may seriously inhibit the action of the catalysts through fouling or poisoning. Probably the most bothersome of the impurities to be removed are the organic compounds of sulfur which are nearly aways present when the gas contains hydrogen sulfide. Removal of hydrogen sulfide does not in itself present much of a problem. This may ordinarily be accomplished by simply passing the gas through beds of iron oxide or subjecting the gas to a rather simple scrubbing operation with an aqueous alkaline wash of sodium carbonate, amines, or other known methods. The removal of organic sulfur however is not so simple and processes heretofore designed for this purpose have not proven entirely satisfactory.

For instance, some of the prior art processes remove only a portion of the organic sulfur or only certain of the organic sulfur compounds present in the gas. Other prior processes are found to be cumbersome, complicated, and costly to operate due to the fact that the reactant used is not readily capable of being regenerated.

It is an object of the present invention to provide a method for removing organic compounds of sulfur from hydrocarbon containing gases which shall be capable of removing substantially all of such compounds in nearly quantitative amounts. A further object of the invention is the provision of a process which shall be simple and inexpensive to operate and in which the reactant may be readily regenerated.

These objects are accomplished by the present invention through the use of silica gel which under certain conditions is found to be an excellent adsorbent for the organic compounds of sulfur normally present in natural gas, refinery gas and other industrial hydrocarbon waste or fuel gases and particularly those enumerated above. Silica gel has also been found advantageous for the present purpose in that it may readily be desorbed of such compounds and regenerated for re-use by simply heating, preferably in a current of hot dry air.

In this respect it is superior to the use of many other adsorbent compounds; activated alumina, for example, usually contains alkaline substances which react with thiols and other acidic compounds, while activated charcoal absorbs some sulfur compounds so strongly it is difficult to obtain satisfactory desorption.

While it has heretofore been proposed to use silica gel as an adsorbent for moisture in the drying of such gases and as a catalyst in the high temperature oxidation of sulfur compounds, the present invention differs from either of these processes, firstly, in that the gas is thoroughly dried before treatment with the gel and, secondly, in that the sulfur compounds present in the gas are not oxidized. Effective adsorption of the compounds by the gel occurs only at normal or room temperature and not at the high temperatures necessary for catalytic oxidation; furthermore, the gases treated do not, as a rule, contain oxygen.

According to the present invention the gas to be treated is first thoroughly dried or freed of moisture as by bubbling through concentrated sulfuric acid, passage through a column of anhydrous calcium chloride, or freezing or the like. The reason for this is that silica gel is a powerful dehydrating agent and will remove moisture from the gas if present, in preference to the adsorption of the gaseous sulfur compounds. Treatment of wet gas in other words quickly exhausts the gel so that it is no longer useful to adsorb the sulfur compounds. The dried gas at substantially room temperature (25° C.) or lower is then passed through a bed of granular silica gel of about ¼ to ½ in mesh, which has been previously dried and activated by heating and drying in a current of dry air heated to a temperature of about 500° C. For continuous operation two beds may be used connected in parallel for alternate operation. Under these conditions the silica gel will adsorb substantially all of the organic compounds of sulfur normally present in the gas. Ordinarily these compounds are present in only relatively small amounts, say 30 to 40 parts per million of gas although the gas may contain larger amounts of hydrogen sulfide and some carbon oxysulfide. While the silica gel will adsorb small amounts of these latter two compounds it is not as effective an adsorbent for them as for the organic compounds of sulfur such as the alkyl sulfides, disulfides, mercaptans, etc. On the other hand the presence of hydrogen sulfide or carbon oxysulfide does not appear to have any deleterious effect on the silica gel. Therefore, should there be an excess of these inorganic compounds in the gas to be treated, i. e., above that which would normally be adsorbed by the gel, the gas may be scrubbed either before or after adsorptions with an alkaline solution of sodium carbonate, amines, etc., as heretofore explained.

The length of time a bed of silica gel may be used for adsorption depends of course on the quantity of organic sulfur in the gas treated and the volume of gas treated. This is best determined by actual experiment and the adsorption process continued until the gas leaving the adsorption unit or bed appears to contain organic sulfur in excess of the minimum permissible depending upon the use to which the gas is to be put. For this purpose it is advantageous to remove any hydrogen sulfide or carbon oxysulfide by scrubbing prior to adsorption but once the period of adsorption is determined for a particular volume of a certain gaseous composition, these inorganic compounds of sulfur may be removed after adsorption, if desired.

Upon saturation of the silica gel with adsorbed sulfur compounds it may be regenerated by simply heating, preferably by means of a current of hot dry air or hydrocarbon combustion products to sweep away the compounds released from the gel. The temperature to which the gel is heated is not especially critical and may range from about 300° C. to 700° C. After desorption the gel is allowed to cool to room temperature and is then ready for re-use to treat additional quantities of gas.

As will be seen from the foregoing description of the invention there is provided a simple, inexpensive method of removing otherwise difficultly removable organic sulfur compounds from natural gas and other hydrocarbon containing gases. The fact that under the conditions specified silica gel may be used to remove substantially all the combined sulfur in the gas does not necessarily preclude its use together with other processes for removing sulfur when for the purpose of securing economy or effectiveness it may be advantageous to do so.

While various specified details of procedure and conditions of operation have been set forth for the purpose of giving a clear understanding of the process, the invention is not limited to the exact details given as it includes modifications and changes coming witin the scope of the appended claims.

I claim:

1. The process of removing compounds of organic sulfur from hydrocarbon containing gases containing the same which comprises drying the gas, subsequently passing the dried gas through a bed of silica gel at normal temperature whereby the sulfur compounds are adsorbed in the gel and thereafter desorbing the gel of such compounds by heating the gel to from 300° C. to 700° C.

2. The subject matter of claim 1, wherein the gel is heated by means of a stream of dry air.

3. The process of removing organic compounds of sulfur from hydrocarbon containing gases which comprises drying the gas under conditions favorable for removing substantially all moisture therefrom, contacting the dry gas with substantially dry silica gel whereby the organic compounds of sulfur are adsorbed in the pores of the gel, discontinuing contact of the gas with the gel upon substantial saturation of the gel with the organic sulfur compounds, desorbing the gel of such compounds and regenerating the gel by passing dry air heated to a temperature of from 300° C. to 500° C. through the gel and contacting additional gas with the regenerated gel for removal of organic sulfur compounds.

References Cited in the file of this patent

FOREIGN PATENTS

| | | | |
|---|---|---|---|
| 1,145,579 | Garner | July 6, | 1915 |
| 1,939,694 | Hasche | Dec. 19, | 1933 |
| 2,293,901 | Hutchinson | Aug. 25, | 1942 |
| 2,449,402 | Lipkin | Sept. 14, | 1948 |